Patented Dec. 1, 1953

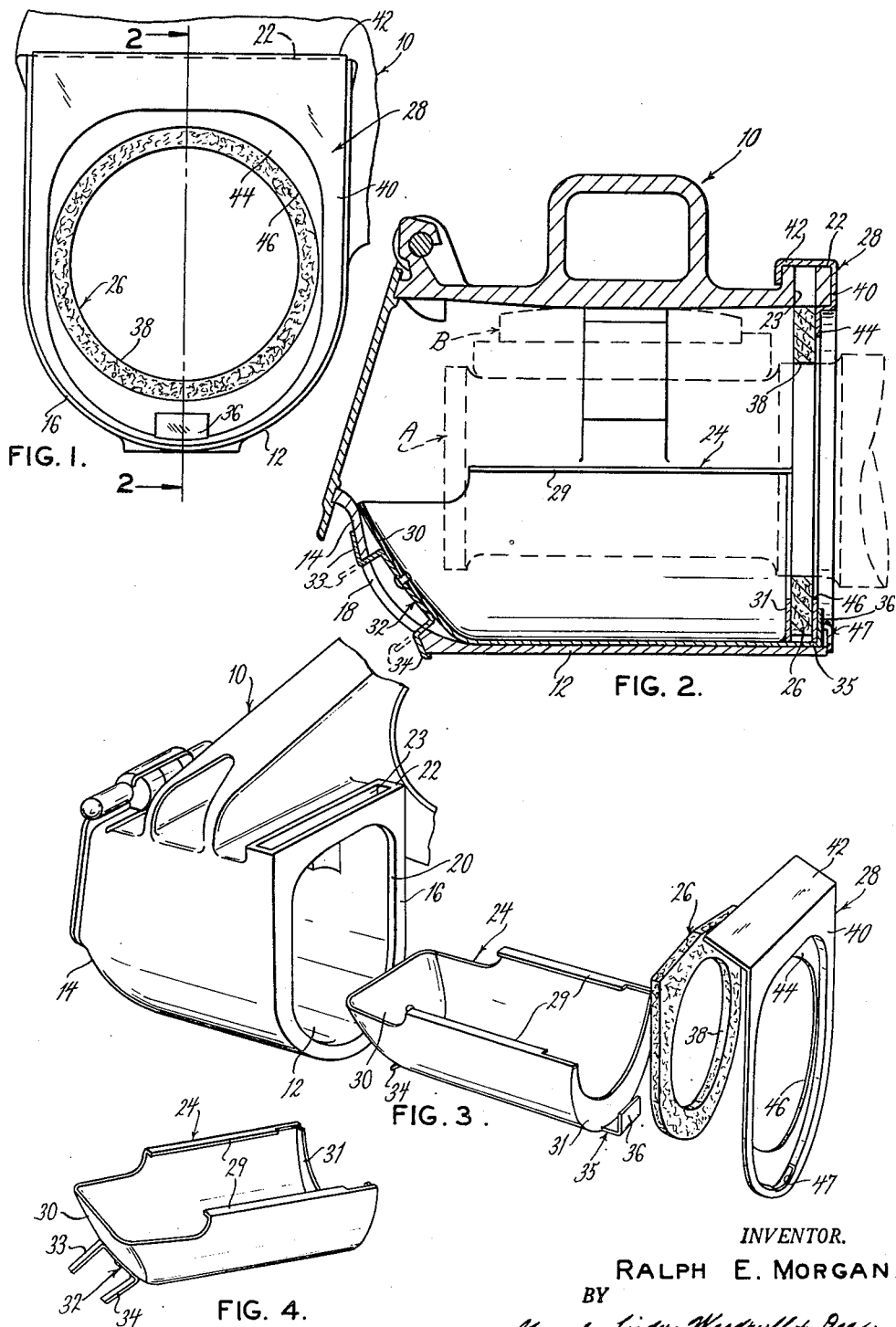

2,661,255

UNITED STATES PATENT OFFICE 2,661,255

REMOVABLE OIL PAN ASSEMBLY

Ralph E. Morgan, Canton, Ohio, assignor to The Timken Roller Bearing Company, Canton, Ohio, a corporation of Ohio Application February 11, 1952, Serial No. 270,943

11 Claims. (Cl. 308—80)

1

The present invention relates generally to the railway car-truck art and more particularly to a novel removable oil pan assembly for use with a side frame journal box which has been modified to accommodate rotary anti-friction bearing.

In order to use an anti-friction bearing of the type shown and described in Patent No. 2,438,214 (R. E. Horger) with a standard ARA journal box, it is necessary to remove portions of the dust guard flanges and waste retaining ribs from the interior of the box, and to cut a circular opening in its outside center base. With the journal boxes so modified, the maintenance crews are faced with quite a difficult servicing problem when it becomes necessary to replace a roller bearing in a locality where only plain bearings are available because the modified journal boxes are not oil tight.

Therefore, it is an object of the present invention to provide a novel removable oil pan assembly for making side frame boxes which have been modified to receive roller bearings, temporarily oil tight, and to provide them with the necessary structural elements to accommodate plain bearing axles. More particularly it is an object to provide such an assembly which re-establishes the equivalent of all of the elements which were removed from the journal box when roller bearings were installed so that a plain bearing axle can be used to move the car to a servicing point where roller bearings and their axles are available.

Another object is to provide an oil pan assembly of the aforementioned type which contains a minimum number of parts, which is relatively inexpensive to manufacture, and which can be easily and quickly installed and removed by relatively inexperienced personnel.

In one form, the assembly briefly includes a trough-like oil pan shaped to fit within the bottom of the modified journal box and containing inwardly extending flange portions which act as waste retaining ribs; a dust guard shaped to fit against the inner end of the oil pan; and a dust guard retainer for holding the dust guard against the end of the oil pan. A bracket is provided at the outer end of the oil pan for removably fastening it to the journal box and a tongue-like member is provided at its inner end for holding together the oil pan, the dust guard and the dust guard retainer. The retainer is clamped to the journal box by a flange portion at its upper end which also seals the dust guard slot in the journal box.

In the drawing:

Fig. 1 is an end view of a modified ARA journal box provided with a dust pan assembly constructed in accordance with the teachings of the present invention, the view being taken from the inner end.

Fig. 2 is a vertical, longitudinal, sectional view taken on the line 2—2 in Fig. 1;

Fig. 3 is an exploded view of the modified journal box and the removable oil pan assembly; and Fig. 4 is a front oblique view of the oil pan taken alone.

Referring to the drawing more particularly by reference numerals, 10 indicates generally a standard ARA side frame journal box which has been modified to receive a roller type bearing by removing portions of the dust guard flanges and waste retaining rib from its interior. Extending into the journal box is the end of an axle "A" which receives a conventional bearing assembly "B."

The box 10 includes a curved bottom wall 12 which is of semi-circular cross section, and an outer wall 14 and an opposed inner wall 16. The bottom portion of the outer wall 14 extends downwardly and inwardly and a circular opening 18 is formed therein to provide access to the lubricant drain of the roller bearing, when one is used. A large opening 20 is formed in the inner wall 16 and is roughly rectangular in shape with a curved bottom edge which has its extreme bottom portion coincident with the inner surface of the bottom wall 12.

As shown more particularly in Figs. 2 and 3, a shoulder 22 extends above the top of the journal box adjacent its inner wall 16 and formed therein is an elongated horizontally disposed dust guard slot 23.

The removable oil pan assembly, which is the subject matter of the present invention, is shown more particularly in Figure 3 and includes a trough-like oil pan 24, a dust guard 26, and a dust guard retainer 28.

The oil pan 24 is preferably fabricated from sheet metal and is roughly of semi-circular cross section with upwardly curving side walls which contain inwardly extending flanges 29 at the upper ends thereof, the flanges serving as waste retainers to prevent waste grab in the journal. The oil pan 24 is shaped complementary to the inner surface of the bottom wall 12 of the journal box 10 so that it fits snugly within the latter and includes a front or outer wall 30 and an inner wall 31. The front or outer wall 30 of the oil pan 24 slopes downwardly and inwardly in the same manner as the outer wall of the journal box, and fastened to the outer surface thereof, as by riveting, is a bendable U-shaped bracket 32 with an outwardly extending upper leg portion 33 and an outwardly extending lower leg portion 34. Extending from the rear or inner wall 31 of the oil pan 24, is a flat tongue-like member 35 with an upturned outer lip 36.

The dust guard 26 is sheet-like in form and is preferably made from leather or felt-like material. It contains a circular opening 38 in the center thereof of a size to snugly receive the end of the truck axle "A," and, as shown more particularly in Figure 3 the bottom edge of the dust guard 26 is semi-circular in shape to correspond to the outer surface of the oil pan 24. The thickness of the dust guard 26 is slightly less than the length of the tongue-like member 35 from the inner wall 31 of the oil pan to the upturned lip 36, for a purpose to appear.

The dust guard retainer 28 is preferably made of sheet metal and contains a flat body part 40 which is shaped like the inner wall 16 of the journal box and which contains a bendable inwardly extending flange 42 at the upper edge thereof. An inwardly extending recessed portion 44 is provided adjacent the center of the body part 40, the recessed portion 44 being of the same shape as the opening 20 in the inner wall 16 so as to fit snugly therein and bear against the dust guard 26, as will be more fully described hereinafter.

A circular opening 46 is formed in the center of the recessed portion 44, the opening 46 being slightly larger than the opening 38 in the dust guard 26 so as to permit slight deformation of the latter by the relative movement of the axle "A."

An elongated arcuate slot 47 of a size to receive the lip 36 of the tongue-like member 35 is provided adjacent the bottom of the dust guard retainer 28 between the body part 40 and the recessed portion 44.

OPERATION

To install the oil pan assembly in the journal box 10, the oil pan 24 is inserted into the opening 20 until the U-shaped bracket 32 protrudes through the opening 18 in the outer wall 14 of the box. The upper leg portion 33 of the bracket is then bent upwardly and the lower leg portion 34 thereof is bent downwardly, thereby securely fastening the oil pan 24 within the box 10 so as to prevent relative longitudinal movement between them.

The dust guard 26 is then positioned on the tongue-like member 35 against the inner wall 31 of the oil pan 24. Thereafter, the dust guard retainer 28 is positioned on the tongue-like member 35 so that the lip part 36 extends through the slot 47. As previously mentioned, the thickness of the dust guard 26 is slightly less than the length of the tongue-like member 35 so that when both the dust guard 26 and the dust guard retainer 28 are positioned on the tongue-like member 35, the lip 36 of the latter is disposed against the outer face of the recessed portion 44 so as to maintain the dust guard 26 against the inner wall 31 of the oil pan 24. The lip 36 also aids in maintaining the body part 40 of the dust guard retainer 28 against the outer surface of the inner wall 16 of the box.

With the body part 40 of the dust guard retainer 28 in the aforementioned position against the wall 16, the flange 42 at the upper end of the retainer is bent downwardly in a double break over the shoulder 22 so as to cover the groove 23 and prevent the entrance of dust and water into the interior of the journal box 10. This bending of the flange 42 over the shoulder 22 also aids in maintaining the oil pan assembly within the journal box 10.

Thus it is apparent that there has been provided a novel removable oil pan assembly which fulfills all of the objects and advantages sought therefor. The oil pan 24 provides a receptacle for receiving the oil and oil-soaked waste, and the inner wall 31 of the oil pan 24 and the recessed portion 44 of the dust guard retainer 28 are the equivalent of the dust guard flanges which had been removed from the interior of the journal box when it was modified for use with roller bearings. Also, the inwardly extending flanges 29 at the upper edges of the walls of the oil pan 24 are the equivalent of the removed waste-retaining ribs.

It will also be noted that the entire assembly comprises only three parts which are relatively simple in construction and relatively inexpensive to manufacture.

Furthermore, even the most inexperienced personnel can easily and quickly install and remove the assembly after a minimum amount of instruction, and the assembly can be continuously reused because the U-shaped bracket 32 and the flange 42 can be re-bent innumerable times.

It is to be understood that the foregoing description and the accompanying drawing have been given only by way of illustration and example, and that changes and alterations in the present disclosure, which will be readily apparent to one skilled in the art, are contemplated as within the scope of the present invention which is limited only by the claims which follow.

What is claimed is:

1. In combination, a railway journal box which is devoid of operative dust guard flanges and waste retaining ribs, a trough-like oil pan having an inner end disposed within the bottom of the journal box; a dust guard disposed against the inner end of the oil pan; a separable dust guard retainer holding the dust guard against the end of the oil pan; and means separate from the journal box maintaining the aforementioned parts in assembled juxtaposition within the journal box.

2. In combination, a railway journal box which is devoid of operative dust guard flanges and waste retaining ribs, a trough-like oil pan having an inner end and disposed within the bottom of the journal box; a dust guard disposed against the inner end of the oil pan; a dust guard retainer holding the dust guard against the end of the oil pan; and means associated with the oil pan in holding engagement with the journal box and with the dust guard retainer maintaining the aforementioned parts within the journal box in assembled juxtaposition.

3. In combination, a railway journal box which is devoid of operative dust guard flanges and waste retaining ribs, a trough-like oil pan having an inner end and disposed within the bottom of the journal box; a dust guard disposed against the inner end of the oil pan; a dust guard retainer holding the dust guard against the end of the oil pan; means on the oil pan in holding engagement with the journal box and with the dust guard retainer; and means on the dust guard retainer in holding engagement with the journal box.

4. In combination, a railway journal box devoid of operative dust guard flanges and waste retaining ribs, a trough-like oil pan having outer and inner walls disposed within the bottom of the journal box, the oil pan having upwardly extending side walls with inwardly extending flange portions adjacent the upper ends thereof; a dust guard disposed against the inner wall of the oil pan; a separable dust guard retainer holding the dust guard against the inner wall of the oil pan; and means connected with the oil pan in holding engagement with the dust guard retainer maintaining the oil pan, the dust guard, and the dust guard retainer in assembled juxtaposition.

5. In combination, a railway journal box which is devoid of operative dust guard flanges and waste retaining ribs, a trough-like oil pan having an inner end and disposed within the bottom of the journal box; a tongue-like member extending from the inner end of the oil pan; a dust guard disposed against the inner end of the oil pan; and a dust guard retainer for holding the dust guard against the end of the oil pan, the dust guard retainer containing an opening therein for receiving the free end of the tongue-like member, the tongue-like member being shaped to maintain the aforementioned parts in assembled juxtaposition.

6. In combination, a railway journal box which is devoid of operative dust guard flanges and waste retaining ribs and which contains an opening in its outer wall, a trough-like oil pan having an inner end and disposed within the bottom of the journal box; a dust guard with an opening therethrough disposed against the inner end of the oil pan; a dust guard retainer holding the dust guard against the inner end of the oil pan; means on the outer end of the oil pan extending through the opening in the outer wall of the journal box in holding engagement with the latter; and means at the inner end of the oil pan in holding engagement with the dust guard retainer maintaining the oil pan, the dust guard, and the dust guard retainer in assembled juxtaposition.

7. In combination, a railway journal box which is devoid of operative dust guard flanges and waste retaining ribs and which contains an opening in its outer wall, a trough-like oil pan having an inner end and disposed within the bottom of the journal box; a dust guard with an opening therethrough disposed against the inner end of the oil pan; a dust guard retainer holding the dust guard against the inner end of the oil pan; means on the outer end of the oil pan extending through the opening in the outer wall of the journal box in holding engagement with the latter; and means on the dust guard retainer in holding engagement with the journal box.

8. In combination, a railway journal box which is devoid of operative dust guard flanges and waste retaining ribs, a trough-like oil pan having an inner end and disposed within the bottom of the journal box; a dust guard with an opening therethrough disposed against the inner end of the oil pan; a dust guard retainer holding the dust guard against the inner end of the oil pan, the dust guard retainer containing an opening adjacent the bottom portion thereof; means on the outer end of the oil pan extending through the opening in the outer wall of the journal box in holding engagement with the latter; and a tongue-like member extending from the inner end of the oil pan and protruding through the opening in the dust guard retainer and in engagement with the latter so as to maintain the oil pan, the dust guard and the dust guard retainer in assembled juxtaposition.

9. In combination, a railway journal box which is devoid of operative dust guard flanges and waste retaining ribs, a trough-like oil pan having an inner end and disposed with the bottom of the journal box; a dust guard with an opening therethrough disposed against the inner end of the oil pan; a dust guard retainer holding the dust guard against the inner end of the oil pan; and means on the dust guard retainer in holding engagement with the journal box.

10. In combination, a railway journal box having an inner wall and an outer wall and which is devoid of operative dust guard flanges and waste retaining ribs and which contains a relatively small opening in its outer wall, a relatively large opening in its inner wall, and a shoulder across the top thereof adjacent its inner wall; a trough-like oil pan having an outer wall and an inner wall, removably disposed in the bottom of the journal box; a dust guard with an opening therethrough disposed within the journal box against the inner wall of the oil pan; a dust guard retainer disposed against the outer face of the inner wall of the journal box and containing a portion extending into the journal box and against the dust guard to hold the latter against the inner end of the oil pan, the dust guard retainer containing an opening adjacent the bottom thereof and a flange portion at its top which is bent into holding engagement with the shoulder of the journal box; the oil pan containing a strap fastened to its outer wall which projects through the opening in the outer wall of the journal box and which is bent into holding engagement with the latter; and a tongue-like member extending from the inner wall of the oil pan and through the opening in the dust guard retainer, the tongue-like member having an upturned end portion in engagement with the dust guard retainer maintaining the oil pan, the dust guard and the dust guard retainer in assembled juxtaposition.

11. An oil pan for use with a railway journal box which is devoid of operative dust guard flanges and waste retaining ribs, comprising a trough-like body portion with inner and outer walls, the body portion being shaped to fit within the bottom of the journal box and having upwardly extending side walls with inwardly extending flanges adjacent the upper ends thereof; a bendable bracket fastened to the outer wall; and a tongue-like member extending from the inner wall and having an upturned free end.

RALPH E. MORGAN.

References Cited in the file of this patent
UNITED STATES PATENTS

| Number | Name | Date |
|---|---|---|
| 298,552 | Carey | May 13, 1884 |